United States Patent [19]

Mason

[11] Patent Number: 4,802,946
[45] Date of Patent: Feb. 7, 1989

[54] METHOD OF CONSTRUCTING LAMINATED PANELS

[76] Inventor: Howard C. Mason, 4421 SW. Coast, Lincoln City, Oreg. 97367

[21] Appl. No.: 52,480

[22] Filed: May 21, 1987

[51] Int. Cl.⁴ .................... B32B 31/12; B32B 31/20
[52] U.S. Cl. ............................ 156/264; 144/348;
    144/352; 156/265; 156/267; 156/299; 156/300;
    156/304.3; 156/304.7
[58] Field of Search .............. 156/299, 300, 304.3,
    156/307.3, 558, 563, 559, 182, 267, 264, 265;
    144/348, 352, 346

[56] References Cited

U.S. PATENT DOCUMENTS

| | | | |
|---|---|---|---|
| 2,323,105 | 6/1943 | Welch | 156/300 |
| 2,490,819 | 12/1949 | Lambert et al. | 156/558 |
| 3,068,920 | 12/1962 | Chandler et al. | 156/555 |
| 3,133,850 | 5/1964 | Alenius | 156/299 |
| 3,556,897 | 1/1971 | Christoffersen et al. | 156/307.3 |
| 4,401,496 | 8/1983 | Koontz, Jr. | 156/559 |
| 4,731,140 | 3/1988 | Yontrarak | 156/267 |

Primary Examiner—Michael Wityshyn
Attorney, Agent, or Firm—Kolisch, Hartwell & Dickinson

[57] ABSTRACT

Method of constructing a laminated panel which used veneer pieces of a standard and uniform size. The width of the veneer pieces is a whole number divisor of the length of the pieces. In a panel assembly, the number of veneer pieces in a layer with grain extending across the grain of an adjacent layer is equal to the whole number divisor determining the width of a piece.

6 Claims, 1 Drawing Sheet

U.S. Patent    Feb. 7, 1989    4,802,946
FIG.1
FIG.2
FIG.3
FIG.4
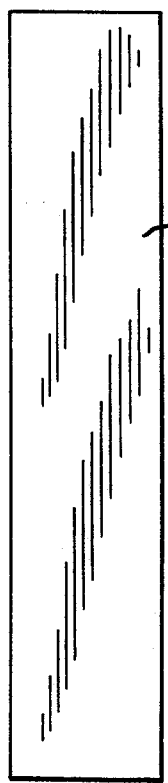
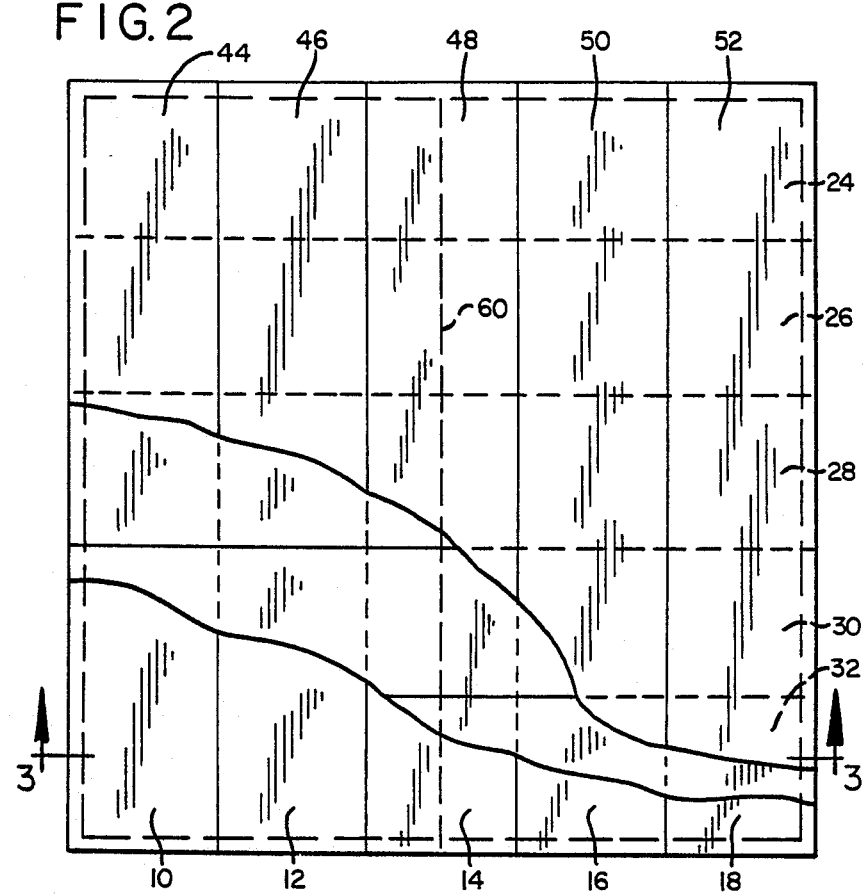
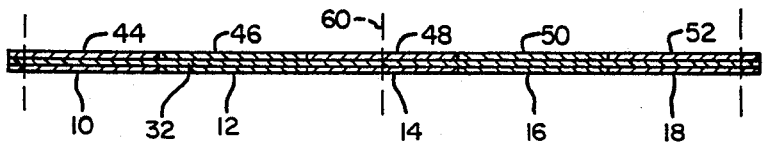
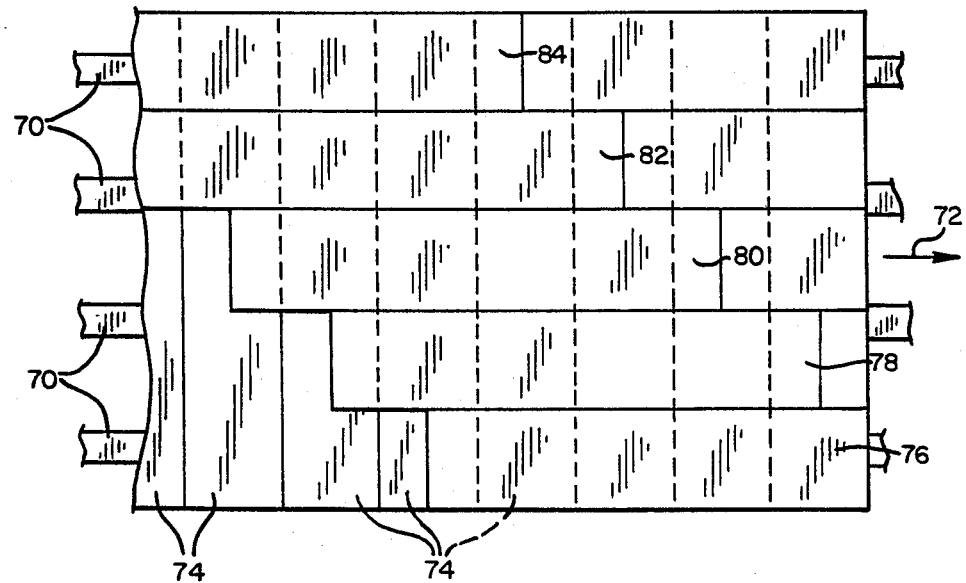

METHOD OF CONSTRUCTING LAMINATED PANELS

BACKGROUND AND SUMMARY OF THE INVENTION

This invention concerns the manufacture of a laminated panel, such as a plywood panel, having multiple layers of veneer pieces which are bonded together in the manufacturing process to produce the final panel. The method contemplated, as distinguished from conventional plywood manufacture procedures, utilizes veneer pieces having a standard and essentially uniform length and width, and where the width of the veneer pieces, i.e., the dimension in a transverse cross-grain direction, is a whole number divisor of the length of the veneer pieces. In the making of panels from stacked layers, the veneer pieces are laid up in such a manner that the layer of veneer pieces in one layer (where the grain of the pieces extends across the grain of veneer pieces in another layer), may have a dimension extending across the layer which is equal to the length of the veneer pieces in the other layer. Following the invention, trim loss in the producing of a standard 4×8' panel is substantially less than following conventional procedures. Furthermore, since all the veneer pieces have a uniform and standard size, substantial economies may be realized in the handling of the veneer pieces, i.e., in their clipping, sorting, drying, storing, laying up, etc.

In manufacturing plywood following conventional procedures of today, and in the making of a standard 4×8' panel, veneer pieces are employed in making the faces, backs and other plies where the grain extends the length of the panel which are of random width and have a length of approximately 102". Veneer pieces are employed in making the remaining plies where the grain extends across the grain of the face and backs having a random width and a length of one-half of 102" or approximately 51". After pressing to consolidate the layers, the panels are trimmed to 4×8' dimension. The excess material which is trimmed off has generally been felt necessary because of the random widths of the sheets which are used, and consequent difficulties, for instance, in building a complete layer up to the exact margins desired in the forming panel. The different widths and lengths of the sheets utilized makes any automated or semiautomated procedure for cutting the veneers difficult, if not impossible, and introduces problems in sorting, maintaining inventory, veneer sheet handling, efficient use of equipment such as driers, etc.

In contradistinction to what has just been described, the method of the invention utilizes veneer pieces of a common and uniform size, where the width of the veneer pieces is a whole number divisor of the length. Such may be utilized in the laying up of a stack of the veneer pieces to produce a panel which is square in outline, and where the number of pieces disposed side-by-side in a ply or layer is the same as the whole number divisor used in dictating the width of the veneer pieces. A panel of this description, and assuming for explanation purposes the use of veneer pieces having 100" length and 20" width (the whole number divisor here being 5), may be produced which has a 100×100" dimension, with five veneer pieces disposed side-by-side in each layer or ply. With minimal trimming, and bisecting of the panel into two pieces, two 4×8' panels result, with far less trim waste than when using conventional practices.

A general object of the invention, therefore, is to provide an improved and new method of manufacturing laminated products from veneer pieces which utilizes veneer pieces of uniform and standardized width and length.

Another object is to provide a method wherein standard 4×8' panels, or panels of other dimensions, may be prepared with substantial reduction of trim waste as results from currently known manufacturing methods.

A corollary to the above is the provision of a method for manufacturing laminated panels which relies on the use of veneer pieces having uniform width and length dimensions, and which, as a result, lends itself to automated procedures, and also results in reduced handling, storage, and inventory costs, and promotes better and more efficient use of capital equipment, such as driers, etc.

These and other objects and advantages are attained by the invention, which is described hereinbelow in conjunction with the accompanying drawings, wherein FIG. 1 illustrates a veneer piece having a width which is a whole number divisor of its length, namely 5;

FIG. 2 illustrates the preparation of a stack of square outline from veneer pieces dimensioned as shown in FIG. 1, the stack having three layers, and further illustrating how the stack may be bisected in the process of producing 4×8' panels;

FIG. 3 is a cross-sectional view, taken along the line 3—3 in FIG. 2; and

FIG. 4 illustrates the production continuous layers of veneer pieces as may be done according to a modification of the invention.

Describing the invention in more detail, an important part of the present invention is the manufacture of panels from veneer sheets or pieces, where the veneer pieces used have a uniform and standard size. In the standard size piece, the width of the veneer piece equals the length of the veneer piece divided by a whole number, the whole number being greater than one. By way of example, and with the use of veneer pieces of 100" length (a length which would lend itself, after trimming and cutting, to the production of a 4×8' panel), then the width of the veneer pieces would be ½, ¼, or 1/5 of this 100" length. With typical lower grade woods, a width of 1/5 of 100" or a width of 20" suggests itself. Such a veneer piece is illustrated in FIG. 1 at 8.

To minimize problems such as inventory, sorting and handling, the veneer pieces also would have a common thickness which typically might be ⅛". In describing a uniform standard width and length, it is not, of course, intended that pieces be precisely of the same dimension, as obviously some variation would occur in the dimensions between particular pieces, with a variation between respective pieces being usually acceptable if within about ⅛ to ¼", by way of example. With refinement of manufacturing procedures, this variance may well be further reduced, with accompanying reduction of the precise dimensions utilized and the amount of trim loss realized in the production ultimately of 4×8' panels.

The veneer pieces are then laid up to form a layered stack, and for the purpose of this description, it will be assumed that a three-ply panel is to be produced comprising face and back plies with grain extending in one direction, and a center or cross ply with grain extending transversely of the grain in the face and back plies.

To produce such a panel, a layer of veneer pieces is prepared with the veneer pieces disposed side edge-to-side edge and parallel and abutting, and with their grain extending in a common direction and with their end edges aligned. Using veneer pieces of 100×20", a layer may be so produced with forms a 100×100" square, and which includes five veneer pieces disposed side-by-side in a direction extending across the grain of the veneer pieces, as illustrated by the pieces 10, 12, 14, 16, and 18 illustrated in FIG. 1.

With the production of such a layer, another layer is prepared over the just-prepared layer, with the same number of veneer pieces but with the pieces in this next layer extending normal to the pieces in the first layer. Again, the pieces in this second layer are disposed side edge-to-side edge, parallel, and with ends aligned, and the aligned ends are aligned with the edges of the terminal pieces in the first layer. Such is demonstrated by the pieces shown at 24, 26, 28, 30, and 32 shown in FIG. 2.

An appropriate adhesive is introduced between the two layers of veneer pieces using any of various known procedures, such as by spray or otherwise coating a set of faces of the veneers in one of the layers, introducing between the layers an adhesive sheet, etc. Exemplary of adhesives that might be employed are those based on phenol-formaldehyde or ureaformaldehyde resins, as are common in the industry. The particular manner of introducing the adhesive or the particular adhesive employed is subject to variation depending upon the manufacturer's requirements Having prepared two layers as just described, the third and final layer (in the case of a three-ply panel) is then prepared over the stack of two layers. Again, five veneer pieces are employed with these disposed side edge-to-side edge, parallel, and with end edges aligned and with the grain of these pieces paralleling the grain of the pieces in the first layer and across the grain of the pieces in the second layer. The veneer pieces in this third and upper layer are illustrated at 44, 46, 48, 50, and 52. To provide for later bonding, an adhesive is introduced between the second and third layers described.

After laying up of the panel, the stack of veneers in the laid up panel may be split to produce two 50×100" panels, by bisecting the laid-up assembly with a cut extending midway between opposite edges of the laid up assembly. Such a cut is indicated at 60 in the drawings. The 50×100" assemblies that are so produced could then be cured in a conventional 4×8' press system. If the assemblies are cut before pressing, the application of pressure to compress and hold the various sheets and the layers together during the cutting operation is indicated. The cut produced normally would be in a direction paralleling the grain in the face and back layers of the assembly.

The 50×100" panel assemblies so produced are then transported to a suitable press and, with the application normally of heat and together with pressure, are cured to produce the final panels save for trimming. With the panel having a nominal size of 50×100", or a face area of 5000 sq. in., trimming to produce a panel of 4×8' dimension, i.e., 48×96" results in a waste of approximately eight percent of the material used in the untrimmed panel, less than half the waste realized when trimming 54×102" assemblies to produce a 4×8' panel following present day procedures.

Where 100×100" press systems are available, the laid up assemblies would be cured prior to ripping and trimming with resultant easier handling of the assemblies.

Furthermore, with pressing and curing before splitting, there is a tendency for less disarray of the pieces in the stacked assembly to occur.

By proper control and disciplining of manufacturing procedures, panel assemblies having, for instance, a 99×99" dimension or a 98×98" dimension, could be prepared in lieu of the 100×100" dimension described, with the realization of even greater savings of wood material by reason of reduced trim allowance.

By having described the preparation of a three-ply panel, it is, of course, not intended to preclude the use of the invention in the manufacture of panels of different ply systems, for instance, panels of four, five, etc., plies.

It is felt that preferably, the veneer should be dried before clipping or sizing to the dimensions discussed. However, if the veneer is clipped while in the so-called green stage, with the veneer pieces so produced then dried, and by reason of shrinkage which occurs when veneer is dried, then clipping and sizing of the veneer sheets at the green stage would be on an oversized basis, to accommodate the shrinkage occurring at the drying stage.

The use of standard and uniformly sized veneer pieces in the laying up of paneling, suggests uses of the veneer pieces in the construction of a continuous panel with the layers or plies in the assembly constructed continuously on a moving conveyor. This method of manufacture is illustrated in FIG. 4.

Referring to this figure, a conveyor is shown at 70 which travels in the direction shown by arrow 72. Veneer pieces forming a bottom layer in the continuous panel produced are shown at 74. Such veneer pieces extends across the direction of conveyor travel, and having ends aligned and their side edges abutting. The next layer of veneer pieces is prepared as exemplified by the pieces shown at 76, 78, 80, 82 and 84. These pieces have a 20" staggering, i.e., are staggered to the extent of the width of the veneer pieces. In this way, the ends of the veneer pieces in the next layer do not align themselves in a region which corresponds to a joint or seam line of the veneer pieces forming the bottom layer of the assembly. Another layer of veneer pieces similar to the layer containing pieces 70 may then be prepared on top of the layer of veneer pieces which have staggered ends. An adhesive binder is introduced between the layers.

With a continuous assembly so produced, such may be further transported to be cut into modules of 50×100" dimension (or 100×100" dimension if larger presses are available). The modules may then be pressed and cured to form the integrated panel, with subsequent trimming to a 4×8' dimension producing the completed panel.

There are numerous advantages to the plywood manufacturing method herein described. Beginning at the lathe, the logs are processed to produce veneer pieces which all have a standard uniform size. This reduces sorting, space requirements, inventory requirements, etc. With subsequent drying and with the uniform size of the veneer pieces, it is possible completely to fill the dryer at all times, with maximum efficiency in the use of the dryer resulting. After drying, again, there is minimal sorting, grading, and handling requirements for the veneer pieces. The method contemplated lends itself for use with automated systems in the sizing, delivery, and lay up of the veneer piece which results in lowering of manpower costs.

While there has been described various modifications of the invention, it is obvious that changes and variations are possible without departing therefrom.

It is claimed and desired to secure by Letters Patent:

1. A method of making a laminated product, such as plywood and the like, from veneer pieces which comprises:

preparing veneer pieces having a common length "l" in their grain direction and a common width in a cross-grain direction, and wherein the width in the veneer pieces equals the length "l" divided by a whole number, the number being greater than one, preparing a stack of first and second layers from the veneer pieces, one of said layers being prepared with plural veneer pieces disposed side-by-side and parallel and abutting and extending in one direction and said preparation being performed with aligning the end edges of the veneer pieces, so that in said one direction, the layer has a dimension equaling "l", the other of said layers being prepared with plural veneer pieces disposed side-by-side and parallel and abutting and extending in a direction normal to said one direction, and the preparation of said other layer being performed with a number of veneer pieces equaling said whole number to produce a layer where side edges of the veneer pieces on opposite sides of the layer are aligned with the aligned end edges of the veneer pieces in said one layer, during preparing of the stack applying an adhesive between the layers, and after preparing of the stack applying pressure and requisite temperature to bond the layers together.

2. The method of claim 1, wherein the length of the veneer pieces is within the range of 97 to 100", and the whole number is 4 or 5.

3. A method of manufacturing plywood which comprises:

preparing a multiplicity of veneer pieces having a common length "l" in their grain direction and a common width in a cross-grain direction, and wherein the width of the veneer pieces in this cross-grain direction equals the length "l" divided by a whole number, the number being greater than one, preparing multiple layers of these veneer pieces, with the layers disposed one on top of another, to form a stack of multiple layers of veneer pieces, certain of said layers being prepared with the veneer pieces disposed side-by-side and substantially parallel and abutting each other and extending in one direction in the stack and the preparation of these layers being performed with a number of pieces equaling said whole number and with aligning of the ends of the veneer pieces so that in said one direction the stack has a uniform dimension equaling "l", the remainder of said layers being prepared with the veneer pieces disposed side-by-side and abutting and extending in a direction normal to said one direction and with the end edges of the veneer pieces aligned and aligned with the side edges of veneer pieces of said certain layers, the preparation of each of said remainder of said layers being performed with a number of pieces equaling said whole number to produce in each of said remainder layers side edges of the veneer pieces on opposite sides of the layers aligned with the aligned end edges of the veneer pieces in said certain layers, during preparation of the stack of multiple layers applying an adhesive binder between the layers, and after preparation of the stack of multiple layers applying pressure and requisite temperature to bind the layers together.

4. The method of claim 3, wherein, the length "l" of the veneer pieces lies within the range of 3 to 5" in excess of 8' and wherein the whole number is either 4 or 5.

5. The method of claim 3, wherein after preparation of the stack of veneer pieces, the stack is cut in a plane extending normal to the layers of veneer pieces in the stack along a line midway between opposite side edges of the stack to bisect the stack into stacks of equal width.

6. The method of claim 4, wherein the veneer pieces are prepared by peeling veneer from a log having a length "l" to produce a continuous layer of veneer bounded by opposed edges separated by the distance "l", and clipping this layer with cuts extending normal to said opposed edges to produce veneer pieces having a width equal to the distance "l" divided by said whole number.

* * * * *